Nov. 15, 1966  L. H. COOK ETAL  3,285,695
PRODUCTION OF AMMONIUM NITRATE
Filed Dec. 13, 1963
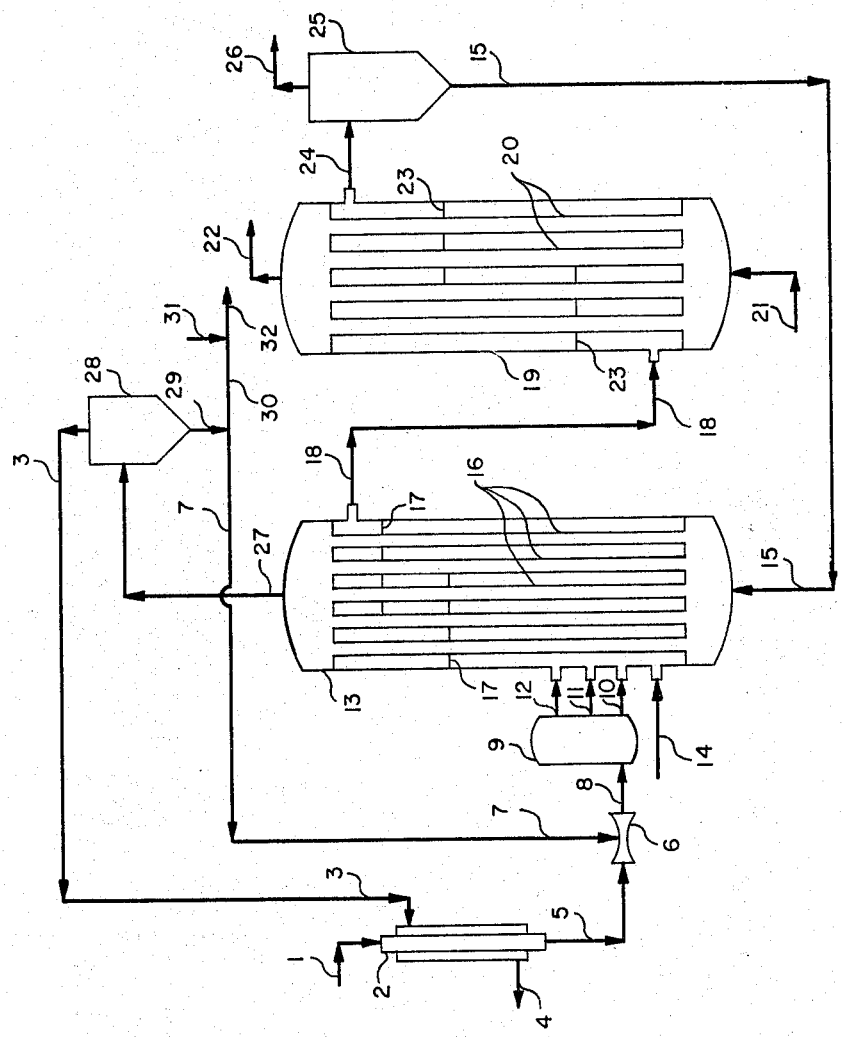
LUCIEN H. COOK
IVO MAVROVIC
INVENTORS
BY J. T. Chalsty
AGENT

United States Patent Office 3,285,695
Patented Nov. 15, 1966

3,285,695
PRODUCTION OF AMMONIUM NITRATE
Lucien H. Cook, Port Washington, and Ivo Mavrovic, New York, N.Y., assignors to Chemical Construction Corporation, New York, N.Y., a corporation of Delaware
Filed Dec. 13, 1963, Ser. No. 330,371
13 Claims. (Cl. 23—103)

The present invention relates to the production of ammonium nitrate, by the reaction between nitric acid and ammonia. An improved procedure for carrying out this reaction is provided, in which the process stream is cooled prior to final concentration and production of concentrated ammonium nitrate solution. The cooling step results in the production of a usable proportion of process steam.

The production of ammonium nitrate is generally carried out by reacting aqueous nitric acid solution with ammonia gas or other gas streams containing ammonia as a principal component. Typical of such gas streams is the off-gas derived from urea synthesis and containing ammonia and carbon dioxide as principal components. In the normal scheme of production, the nitric acid and ammonia streams are mixed at or near atmospheric pressure in a vessel which may contain a proportion of ammonium nitrate solution, which serves to moderate the ensuing reaction. The formation of ammonium nitrate is a highly exothermic reaction and the resultant heat of reaction drives inerts and water vapor from the reaction mixture. A concentrated ammonium nitrate solution is drawn off from the bottom of the reaction vessel. As the water vapor and inerts are usually purged to the atmosphere, it is evident that the large amount of heat borne by these gases is wasted. In addition, any residual ammonia present in the gas phase is also driven off with the inerts and water vapor and thus represents a process loss.

Recovery of heat from this process environment has been carried out in the prior art by passing the product ammonium nitrate solution in heat exchange with the reacting mixture. This procedure, as shown in U.S. Reissue Patent No. 21,217, results in the production of concentrated ammonium nitrate solution and a gaseous mixture of steam and ammonia vapor. The hot gaseous mixture of steam and ammonia is not usable per se as a heat source for steam generation, and thus in general this process stream is merely cooled and refluxed in a rectifying column to recover the ammonia vapor for recycle. According to U.S. Reissue Patent No. 21,217, refluxing is carried out by cooling the gaseous mixture in heat exchange with process feed streams of ammonia and nitric acid. It is evident that this procedure does not result in the production of usable process steam, and the heat of vaporization of the steam in the hot gaseous mixture is merely employed as a low-level heat source to preheat the reactant feed streams.

Other prior art procedures involve a direct loss of the sensible heat of the steam generated by the process reaction. Thus, in U.S. Patents Nos. 2,167,464 and 2,109,347, the ammonium nitrate solution is concentrated by vacuum flash evaporation, with concomitant condensation of the generated steam using cooling water. In these procedures, the heat of vaporization of the steam is completely lost and there is a net consumption of steam or power to produce the required vacuum.

In the present invention, a process is provided whereby concentrated ammonium nitrate solution is produced by reaction of nitric acid and ammonia, with concomitant production of process steam at a usable pressure level. The feed streams of nitric acid and ammonia are reacted while in heat exchange with dilute ammonium nitrate solution derived from a later stage of the process. The combination of nitric acid and ammonia results in the production of a mixed process stream containing liquid and gaseous phases. The liquid phase consists of ammonium nitrate solution while the gas phase consists principally of steam. When the ammonia source consists of urea synthesis off-gas, the gas phase will contain a substantial proportion of carbon dioxide.

The mixed process stream is passed in heat exchange with liquid water, which is vaporized to produce export process steam at a usable pressure and temperature level. The heat for the steam production is obtained from the mixed process stream in two ways, as sensible heat of cooling and as heat of condensation of water vapor from the gas phase of the mixed process stream. The condensation of water vapor from the gas phase of the mixed process stream is highly important, and is the basis of the novel heat recovery concept of the present invention.

In the customary prior art procedures, the gas phase of the mixed process stream is separated from the liquid phase in the reaction vessel, or immediately thereafter. Thus, heat of condensation of the water vapor could not be recovered at a useful temperature level in prior art processes, since substantial condensation of water vapor by cooling of the gas phase by itself would not take place until the temperature dropped to a low level at which heat recovery has no practical value. However, in the process of the present invention, condensation of water vapor takes place at a high temperature level because of the presence of ammonium nitrate solution, which lowers the vapor pressure of water. Hence, since the two phases of the equilibrium mixed process stream are not separated before attempting heat recovery, condensation of water vapor from the gas phase commences immediately as the temperature is lowered, because the gas phase over the liquid phase is saturated with water vapor at equilibrium. Thus, the heat from this condensation is used to produce steam at a usable pressure level by vaporization of liquid water in heat exchange with the mixed process stream.

After heat exchange with liquid water and concomitant cooling, the mixed process stream now consists of a dilute ammonium nitrate solution together with a gaseous phase consisting of residual water vapor and inerts such as carbon dioxide. The gaseous phase is separated in a conventional gas-liquid separator and is discharged. The dilute ammonium nitrate is passed in heat exchange with reacting nitric acid and ammonia as mentioned supra, and is thus heated and concentrated by the boiling off of contained water. The concentrated solution and steam mixture is passed to a steam separator, from which product concentrated ammonium nitrate solution is recovered.

The procedure of the present invention has two main advantages. First, the heat which was lost in prior art procedures via discharge of hot stock gases is now recovered as a net amount of export process steam at a usable pressure and temperature level. Second, ammonia losses are substantially reduced as compared to prior procedures in which water vapor is removed from the ammonium nitrate solution at elevated temperature. This is due to two factors. A primary factor in reducing ammonia losses is the fact that the mixed process stream derived from nitric acid-ammonia reaction is cooled so as to condense a substantial proportion of water vapor into the liquid phase. This serves in effect to scrub the gas phase and thus residual ammonia vapor is dissolved into the liquid solution, with concomitant reaction of this ammonia with residual nitric acid in the liquid phase. In addition, since inert gases are purged after cooling of the mixed process stream to a relatively low temperature level, the vapor pressure of ammonia is substantially reduced and thus ammonia losses are held to a minimum.

It is an object of the present invention to produce ammonium nitrate in an improved manner.

Another object is to produce ammonium nitrate by means of a more efficient process.

A further object is to produce ammonium nitrate with concomitant production of usable process steam.

An additional object is to reduce ammonia losses in the production of ammonium nitrate.

Still another object is to efficiently produce ammonium nitrate using urea synthesis off-gas as an ammonia source.

Still a further object is to produce and concentrate ammonium nitrate solution in an improved manner.

An object is to produce concentrated ammonium nitrate solution by means of a procedure in which initially produced solution is first diluted by re-condensation of concomitantly produced water vapor and then heated to drive off water vapor and re-concentrate the solution.

These and other objects and advantages of the present invention will become evident from the detailed process description which follows. Referring to the figure, a flowsheet is presented which embodies preferred embodiments of the procedure of the present invention. In the process description infra, all concentrations are expressed as percent by weight. In addition, it should be noted that ranges of process variables when specified infra serve merely to point out the preferred embodiment of the present invention, wherein the best mode of carrying out the invention is achieved. Thus, it will be understood that the process may be carried out in practice under suitable process conditions outside these ranges, while achieving the advantageous results in the present invention.

Referring to the figure, process feed stream 1 consists of an aqueous nitric acid solution, typically of 56% acid strength. Stream 1 is usually provided at substantially ambient temperature, thus stream 1 is preferably preheated in steam preheater 2 to an elevated temperature preferably in the range of 150° F. to 250° F. prior to reaction, in order to recycle low level heat to the reaction and provide higher reaction temperature. Preheater 2 is provided with low pressure steam via 3, derived from the process in a manner to be described infra, with condensate removal via 4.

The heated nitric acid stream 5 now passes into eductor 6, which is a preferred type of liquid mixer. Stream 5 is accelerated in eductor 6 due to venturi-like flow constriction, with input of recycle concentrated ammonium nitrate stream 7 taking place at or near the point of maximum velocity and lowest pressure. The two process streams 5 and 7 are thus intimately mixed in unit 6, and a combined stream 8 is produced. Stream 7 acts as a diluent for the nitric acid stream, thereby serving to moderate the subsequent reaction with ammonia. Other types of mixers may be provided instead of unit 6. In addition, it will be understood that dilution of the nitric acid feed stream with ammonium nitrate solution may not be required or provided in some cases, especially when the nitric acid feed stream is initially a relatively dilute solution. The combined stream 8 now preferably passes into manifold 9, whereby stream 8 is divided into a plurality of smaller streams 10, 11 and 12 which are passed into the shell of concentrator-neutralizer 13 at spaced intervals, in order to distribute and thus moderate the neutralization reaction which takes place in the shell of unit 13. The division of stream 8 into a plurality of smaller streams such as 10, 11 and 12 prior to reaction may not be necessary in some cases, or alternatively the ammonia feed stream 14 may be divided into a plurality of smaller feed streams, and passed into unit 13 in a manner similar to streams 10, 11 and 12 described supra.

Ammonia feed stream 14 is passed into the shell of unit 13 and reacts with the nitric acid feed streams 10, 11 and 12, thus forming ammonium nitrate and generating heat. Stream 14 may consist of ammonia vapor, aqueous ammonia solution, or liquid ammonia. Any other feed stream containing ammonia such as the off-gas derived from urea synthesis and containing ammonia, carbon dioxide and water vapor may be employed as stream 14. Thus, it will be appreciated that although stream 14 preferably consists of gaseous ammonia per se, other equivalent ammonia sources may be utilized. The off-gas derived from urea synthesis is also preferable as a source of stream 14, since in this case the process steam generated in a manner to be described infra is advantageously employed in the urea synthesis process to concentrate aqueous urea solution.

The relative flow rates of stream 14 compared to streams 10, 11 and 12 may be such as to provide essentially stoichiometric proportions of ammonia and nitric acid in the subsequent reaction mixture. However, it will be preferable to provide a slight excess of nitric acid, so that the mixed process stream will be slightly acidic, thus depressing ammonia vapor pressure and reducing ammonia losses in the subsequent venting of inerts such as carbon dioxide. The unreacted nitric acid in the product ammonium nitrate solution is subsequently neutralized by injection of trim ammonia, as will appear infra.

Concentrator-neutralizer unit 13 is a combination reactor and shell-and-tube heat exchanger, with reaction between the ammonia feed stream 14 and the nitric acid feed streams 10, 11 and 12 taking place in the lower part of the shell of the unit. This reaction preferably takes place at a temperature in the range of 275° F. to 350° F. and a pressure in the range of 10 p.s.i.g. to 100 p.s.i.g, with temperature moderation being achieved by passage of dilute aqueous ammonium nitrate solution 15 through the tubes 16 of unit 13. Thus, the heat generated by the formation of ammonium nitrate in the shell of unit 13 is concomitantly withdrawn and utilized in heating of stream 15 within tubes 16.

A mixed gas-liquid process stream consisting of aqueous ammonium nitrate solution, steam and gaseous inerts such as carbon dioxide is formed and rises through the shell of unit 13, external to tubes 16. Baffles 17 are provided within the shell side of unit 13, in order to impart a horizontal component of flow direction to the rising mixed process stream. Thus the flow of the mixed process stream is directed transverse to the tubes 16, with consequent improved heat transfer to the dilute ammonium nitrate solution within the tubes 16. This is in accordance with conventional heat exchanger practice.

The resulting mixed gas-liquid process stream is withdrawn as a single process stream 18 from the upper shell of unit 13. Stream 18 which is at a temperature in the range of 275° F. to 350° F. is now cooled by heat exchange with liquid water, with concomitant generation of usable process steam at a relatively high pressure level. Thus, stream 18 is passed into the shell of steam recovery condenser 19, which is of conventional shell-and-tube heat exchanger configuration. Unit 19 is provided with internal tubes 20, through which water suitable for steam generation is passed via stream 21. The resulting steam generated by vaporization of water stream 21 is removed from tubes 20 via upper outlet stream 22, preferably at a pressure in the range of 10 p.s.i.g to 30 p.s.i.g. The mixed process stream 18 is cooled, preferably to a final temperature in the range of 250° F. to 300° F., while rising through the shell of unit 19. In addition to removal of sensible heat from stream 18, a substantial proportion of the water vapor in stream 18 is condensed into the liquid phase at a high temperature level, thus transferring high level heat to the water inside tubes 20 with concomitant steam generation. As discussed supra in the initial description of the process, the fact that the liquid ammonium nitrate solution phase is present in stream 18 serves to achieve condensation of the water vapor at a comparatively high temperature level, by lowering the vapor pressure of water. The condensation of water vapor from stream 18 also serves to recover residual ammonia vapor which is concomitantly scrubbed from the gas phase into the liquid solution. Thus, ammonia losses are substantially reduced or prevented, since the residual gaseous phase is subsequently vented, as will appear infra. The rising mixed process stream in the shell of unit 19 is diverted transversely to the tubes 20 by baffles 23, which have a function similar to baffles 17 described supra.

The mixed process stream is now removed from unit 19 via stream 24, which contains a liquid phase consisting of dilute ammonium nitrate solution and a gaseous phase consisting of residual water vapor and inerts. When ammonia reactant stream 14 consists of urea synthesis off-gas, the inerts in stream 24 will consist principally of carbon dioxide. Stream 24 is separated into gaseous and liquid phases in separator 25, which is a conventional gas-liquid separator appartus such as a baffled cyclonic unit. The gaseous phase is discharged via stream 26, while the liquid phase is recycled to the process via stream 15.

Stream 15 will typically consist of 70% aqueous ammonium nitrate solution, at a temperature in the range of 250° F. to 300° F. Stream 15 is now recycled and heated in the tubes 16 of unit 13. This heating serves to concentrate the ammonium nitrate solution, by driving off water as low pressure steam. Thus, a mixed stream 27 is removed from the tubes 16 of unit 13 at a temperature in the range of 275° F. to 325° F. Stream 27 consists of steam at a pressure preferably in the range of 5 p.s.i.g to 20 p.s.i.g, and concentrated ammonium nitrate solution, typically of 83% strength and preferably of at least 80% strength. The mixed stream 27 is passed into gas-liquid separator 28, which is an appartus similar in configuration and function to unit 25 described supra. The separated steam is removed from unit 28 via stream 3, and recycled to the nitric acid preheater as described supra. The concentrated ammonium nitrate solution is removed from separator 28 via stream 29. A portion of stream 29 is preferably recycled to the process as diluent stream 7, which is combined with the feed nitric acid stream as described supra. The balance of stream 29, consisting of concentrated ammonium nitrate solution 30, now passes to product utilization.

As described supra, it is preferable to maintain the process streams slightly acidic by providing a slight excess of nitric acid feed over the stoichiometric requirement, thus depressing ammonia vapor pressure and curtailing ammonia losses. In this case, it is necessary to add a small amount of trim ammonia via stream 31 to the product solution 30, in order to neutralize the excess acidity. The final product solution is thus formed as stream 32.

Various process auxiliaries such as flow control valves and pressure regulators have not been mentioned in the process description supra. It will be apparent that such process control devices will be suitably provided in practice, so as to achieve process continuity. In addition, it will be appreciated that alternative apparatus configurations may be provided in practice, to achieve the process functions of the various apparatus units described supra. It will also be apparent that process modifications and variations besides those mentioned supra may be provided in practice, in order to efficiently achieve the results of the present invention. Thus for example, in some cases it may prove desirable to provide other process streams besides stream 7 to act as the diluent for the nitric acid feed stream. It will be evident that a portion of stream 15 or a portion of the liquid phase of stream 18 may suitably be employed for this purpose. Numerous other alternatives will occur to those skilled in the art.

An example of an industrial application of the process of the present invention will now be described. In the example infra, all process flows and compositions of process streams are expressed in pounds per hour.

*Example I*

A urea synthesis off-gas was neutralized with aqueous nitric acid solution in accordance with the process of the present invention, to produce concentrated ammonium nitrate solution and process steam. The nitric acid solution was received at 60° F., and contained 21,820 nitric acid and 16,500 water. This feed stream was preheated to 200° F. by heat exchange with 5270 steam which was condensed at 5 p.s.i.g. in the steam preheater. This heat exchange unit had 660 square feet of heat transfer surface, and the heat transfer rate was 4,900,000 B.t.u./hour.

The preheated nitric acid solution was reacted with a urea synthesis off-gas received at 240° F. and 50 p.s.i.g., and containing 4890 carbon dioxide, 5900 ammonia and 2070 water vapor. The reaction took place in the shell of the concentrator-neutralizer, which had 2,920 square feet of heat exchange surface. Total heat transfer was 5,250,000 B.t.u./hour, with the mixed process stream being cooled by heat exchange with dilute ammonium nitrate solution passing through the tubes of the unit. The resulting mixed gas-liquid process stream was removed from the concentrator-neutralizer at 320° F., and contained 27,780 ammonium nitrate, 4890 carbon dioxide, and 18,570 water. This mixed process stream was cooled to 270° F. in the shell of the steam recovery condenser, with concomitant substantial condensation of water vapor from the gaseous to the liquid phase at this elevated temperature range being achieved due to the presence of the liquid ammonium nitrate phase. The steam recovery condenser had 4000 square feet of heat exchange surface, and total heat transfer was 5,782,000 B.t.u./hour, with concomitant vaporization of 6000 condensate water and generation of 20 p.s.i.g. steam for process usage.

The resulting cooled mixed process stream was now passed at a temperature of 270° F. and 19 p.s.i.g. pressure into a gas-liquid separator. A gaseous stream containing 4890 carbon dioxide and 7750 water vapor was vented to atmosphere, and the residual liquid phase consisting of dilute ammonium nitrate solution and containing 27,720 ammonium nitrate and 10,820 water was passed through the tubes of the concentrator-neutralizer and heated to 290° F. with concomitant concentration of the liquid phase and generation of steam at 5 p.s.i.g. The generated steam was separated from the liquid phase and passed to the nitric acid preheater, and the residual liquid phase consisting of product 83% ammonium nitrate solution and containing 27,720 ammonium nitrate and 5,550 water was passed to product utilization. A small amount of trim ammonia was injected into the product solution to neutralize residual acidity.

It is apparent from the data in the example supra that 6000 pounds/hour of 20 p.s.i.g. process steam was produced essentially free of charge. This process steam was utilized in concentration of urea solution at the adjacent urea synthesis facility, thus eliminating any requirement for a steam generation facility in the urea plant. It is evident that this process steam could also be directly utilized within the urea synthesis process itself, to provide thermal requirements for decomposition of ammonium carbamate and generation of the mixed urea synthesis off-gas. Another alternative usage for this process steam is in vaporizing and preheating the urea synthesis feed streams, particularly the ammonia feed stream. This usage of the 20 p.s.i.g. process steam is highly advantageous, since it results in the concomitant production of an extra amount of high pressure steam derived by vaporization of condensate water in heat exchange with the reactants in the urea synthesis autoclave.

It should be noted that the gaseous stream vented to atmosphere from the gas-liquid separator at 270° F., and containing 4890 carbon dioxide and 7750 water vapor is eminently suitable for usage as a raw material in the urea synthesis process. This gas stream contains essentially pure carbon dioxide plus water vapor, and the water vapor is readily removed by quenching the gas stream with cooling water or other means. The remaining carbon dioxide thus may be compressed and recycled to the urea synthesis autoclave. This modification is highly advantageous, since the total carbon dioxide requirement for urea synthesis is usually derived from the gas reform section of the ammonia synthesis facility, which supplies ammonia to the urea synthesis plant. The gas reform section provides carbon dioxide either from flue gas or from the regenerator of alkaline scrubbing units which remove carbon dioxide from the synthesis gas. In any case, this carbon dioxide must usually be transported a considerable distance, since safety requirements usually necessitate spacing ammonia synthesis and ammonium nitrate production facilities at a considerable distance from each other. Thus, when urea synthesis off-gas is employed in ammonium nitrate production as in the example supra, the by-product carbon dioxide is available in close proximity to the urea synthesis facility and the quantity of carbon dioxide transferred from the ammonia synthesis facility may be significantly reduced.

An example of the application of the process of the present invention to the conventional reaction of ammonia with nitric acid to produce ammonium nitrate will now be described. As in Example I supra, all process flows and compositions of process streams are expressed in pounds per hour.

*Example II*

Liquid ammonia was neutralized with aqueous nitric acid solution in accordance with the process of the present invention, to produce concentrated ammonium nitrate solution and process steam. The nitric acid solution was received at 60° F., and contained 19,687 nitric acid and 16,100 water. This feed stream was preheated to 200° F. by heat exchange with 3750 steam which was condensed at 7 p.s.i.g. in a steam-heated preheater unit. The liquid ammonia was received at 60° F. and consisted of 5313 ammonia free of inerts. The liquid ammonia was vaporized and preheated to 200° F. by heat exchange with 3400 steam which was condensed at 7 p.s.i.g. in a second steam-heated preheater unit.

The preheated nitric acid solution was reacted with the vaporized and preheated ammonia in the shell of the concentrator-neutralizer, with the reacting process streams being cooled by heat exchange with dilute ammonium nitrate solution passing through the tubes of the unit. The resulting mixed gas-liquid process stream was removed from the shell of the concentrator-neutralizer at 55 p.s.i.g. and 350° F., and consisted of a gaseous phase containing 3,850 steam and a liquid phase containing 25,000 ammonium nitrate and 12,250 water. This mixed process stream was cooled to 317° F. in the shell of the steam recovery condenser, with concomitant complete condensation of the steam from the gaseous to the liquid phase at this elevated temperature range being achieved due to the presence of the liquid ammonium nitrate phase. Concomitant vaporization of 4850 condensate water took place in the tubes of the steam recovery condenser, resulting in the generation of 50 p.s.i.g. steam for process usage.

The resulting cooled process stream was removed in the liquid state from the shell of the steam recovery condenser at 45 p.s.i.g. and 317° F., and consisted of 25,000 ammonium nitrate and 16,100 water. This process stream was now passed through the tubes of the concentrator-neutralizer and heated at 7 p.s.i.g. to 310° F., with concomitant concentration of the liquid phase and generation of 12,980 steam at 7 p.s.i.g. The generated 12,980 steam was separated from the liquid phase, and portions of this 7 p.s.i.g. steam were employed in the nitric acid preheater and the ammonia vaporizer and preheater as described supra.

The residual liquid phase consisting of 89% ammonium nitrate solution at 310° F. and containing 25,000 ammonium nitrate and 3,120 water was now passed to the tubes of an air sweep evaporator at atmospheric pressure, for final concentration to produce 95% solution. The air sweep evaporator was heated by 1400 steam at 50 p.s.i.g., which was derived from the steam recovery condenser as described supra and passed to the shell of the evaporator unit. The 3450 balance of the 50 p.s.i.g. steam was passed to export usage. The liquid ammonium nitrate solution was passed downwards through the tubes of the air sweep evaporator. This solution flowed countercurrent to 5800 air, which had been preheated from 60° F. to 190° F. in a steam heated preheater while in heat exchange with 240 steam at 7 p.s.i.g. The resulting product 95% ammonium nitrate solution removed from the evaporator contained 25,000 ammonium nitrate and 1320 water, while the preheated air employed in the evaporator was subsequently discharged to atmosphere at 280° F. and consisted of 5800 air and 1800 water vapor.

In summary, the process of the present invention as applied to the neutralization of ammonia free of inerts in Example II supra resulted in the production of 95% ammonium nitrate solution containing 25,000 ammonium nitrate plus 5590 steam for export at 7 p.s.ig. and 3450 steam for export at 50 p.s.i.g.

We claim:

1. Process for the production of concentrated ammonium nitrate solution and process steam which comprises reacting aqueous nitric acid solution with a gas stream comprising ammonia vapor, thereby producing a mixed process stream comprising ammonium nitrate solution and steam, said reaction taking place while the process stream is in heat exchange with dilute ammonium nitrate solution, cooling said mixed process stream by heat exchange with liquid water whereby said liquid water is vaporized to form process steam and at least a portion of the steam in said mixed process stream is condensed into the liquid ammonium nitrate solution to form said dilute ammonium nitrate solution, heating said dilute ammonium nitrate solution by said heat exchange with reacting nitric acid and ammonia whereby a portion of the water content of said solution is vaporized to form steam at low pressure, and separating said low pressure steam from product concentrated ammonium nitrate solution.

2. Process of claim 1, in which said gas stream comprising ammonia vapor consists of a mixed off-gas derived from urea synthesis and containing carbon dioxide gas, and said carbon dioxide gas is separated from the liquid process stream comprising dilute ammonium nitrate solution by gravimetric converging of a lower liquid solution phase below an upper carbon dioxide gas phase, after said heat exchange with liquid water and prior to said heat exchange of dilute ammonium nitrate solution with reacting nitric acid and ammonia.

3. Process of claim 1, in which a portion of said product concentrated ammonium nitrate solution is recycled and combined with said aqueous nitric acid solution prior to said reaction of nitric acid with ammonia vapor, whereby said reaction is moderated and localized overheating is prevented.

4. Process of claim 3, in which said ammonium nitrate solution and said nitric acid solution are combined by mixing said solutions in an eductor, said nitric acid solution serving as the motive fluid and being accelerated in said eductor whereby said ammonium nitrate solution is aspirated into a mixture with said nitric acid solution.

5. Process of claim 1, in which said aqueous nitric acid solution is preheated prior to said reaction with ammonia vapor, by passing said aqueous nitric acid solution in heat exchange with said low pressure steam.

6. Process of claim 1, in which said aqueous nitric acid solution is reacted in stoichiometric excess relative to said ammonia vapor, whereby said product concentrated ammonium nitrate solution contains unreacted nitric acid, and an auxiliary stream of ammonia is added to said concentrated ammonium nitrate solution whereby said solution is neutralized.

7. Process of claim 1, in which said aqueous nitric acid solution is divided into a plurality of separate streams prior to said reaction with ammonia vapor, and said separate streams are added to said ammonia vapor in separate stages whereby the resulting reaction is moderated and localized overheating is prevented.

8. Process for the production of concentrated ammonium nitrate solution and process steam which comprises reacting aqueous nitric acid solution with a gas stream comprising ammonia vapor at a temperature in the range of 275° F. to 350° F. and pressure in the range of 10 p.s.i.g. to 100 p.s.i.g., thereby producing a mixed process stream comprising ammonium nitrate solution and steam, said reaction taking place while the process stream is in heat exchange with dilute ammonium nitrate solution, cooling said mixed process stream to a final temperature in the range of 250° F. to 300° F. by heat exchange with liquid water whereby said liquid water is vaporized to form process steam at a pressure in the range of 10 p.s.i.g. to 30 p.s.i.g. and at least a portion of the steam in said mixed process stream is condensed into the liquid ammonium nitrate solution to form said dilute ammonium nitrate solution, heating said dilute ammonium nitrate solution to a final temperature in the range of 275° F. to 325° F. by said heat exchange with reacting nitric acid and ammonia whereby a portion of the water content of said solution is vaporized to form steam at a pressure in the range of 5 p.s.i.g. to 20 p.s.i.g., and separating said steam from product concentrated ammonium nitrate solution containing less than 20% water content by weight.

9. Process of claim 8, in which said aqueous nitric acid solution is preheated to a temperature in the range of 150° F. to 250° F. prior to said reaction with ammonia vapor, by heat exchange with said steam separated from product concentrated ammonium nitrate solution.

10. Process of claim 8, in which said dilute ammonium nitrate solution is of about 70% concentration and said product concentrated ammonium nitrate solution is of about 83% concentration.

11. Process for the production of concentrated ammonium nitrate solution and high pressure steam which comprises reacting aqueous nitric acid solution with ammonia, thereby producing a mixed process stream comprising ammonium nitrate solution and steam, said reaction taking place while the process stream is in heat exchange with dilute ammonium nitrate solution, cooling said mixed process stream by heat exchange with liquid water whereby said liquid water is vaporized to form high pressure steam and at least a portion of the steam in said mixed process stream is condensed into the liquid ammonia nitrate solution to form said dilute ammonium nitrate solution, heating said dilute ammonium nitrate solution by said heat exchange with reacting nitric acid and ammonia whereby a portion of the water content of said solution is vaporized to form steam at low pressure, and separating said low pressure steam from product concentrated ammonium nitrate solution.

12. Process of claim 11, in which said high pressure steam is produced at a pressure in the range of 10 p.s.i.g. to 50 p.s.i.g.

13. Process for the production of concentrated ammonium nitrate solution and process steam which comprises combining aqueous nitric acid solution with concentrated ammonium nitrate solution by mixing said solutions in an eductor, said nitric acid solution serving as the motive fluid and being accelerated in said eductor whereby said ammonium nitrate solution is aspirated into a mixture with said nitric acid solution, reacting the resulting mixed solution of ammonium nitrate and nitric acid with ammonia, thereby producing a mixed process stream comprising ammonium nitrate solution and steam, said reaction taking place while the process stream is in heat exchange with dilute ammonium nitrate solution, cooling said mixed process stream by heat exchange with liquid water whereby said liquid water is vaporized to form process steam and at least a portion of the steam in said mixed process stream is condensed into the liquid ammonium nitrate solution to form said dilute ammonium nitrate solution, heating said dilute ammonium nitrate solution by said heat exchange with reacting nitric acid and ammonia whereby a portion of the water content of said solution is vaporized to form steam at low pressure, separating said low pressure steam from product concentrated ammonium nitrate solution, and recycling a portion of said product concentrated ammonium nitrate solution to mixture with said aqueous nitric acid solution as said concentrated ammonium nitrate solution.

References Cited by the Examiner
UNITED STATES PATENTS

| | | | |
|---|---|---|---|
| 1,315,674 | 9/1919 | Landis | 23—103 |
| 1,700,914 | 2/1929 | Toniolo | 23—103 |
| 2,089,957 | 8/1937 | Harris et al. | 23—103 |
| 2,167,464 | 7/1939 | Rogers et al. | 23—103 |
| 2,723,183 | 11/1955 | Dorsey | 23—103 |

MILTON WEISSMAN, *Primary Examiner.*

MAURICE A. BRINDISI, OSCAR R. VERTIZ,
*Examiners.*

J. J. BROWN, *Assistant Examiner.*